United States Patent Office 3,456,020
Patented July 15, 1969

3,456,020
PRODUCTION OF 2,2'-METHYLENE BIS(3,4,6-TRICHLOROPHENOL)
Thomas F. Cleary, Summit, N.J., assignor to Centerchem Inc., New York, N.Y., a corporation of New York
No Drawing. Continuation-in-part of application Ser. No. 489,036, Sept. 21, 1965. This application Nov. 28, 1967, Ser. No. 686,290
Int. Cl. C07c 37/00
U.S. Cl. 260—619                    3 Claims

ABSTRACT OF THE DISCLOSURE

This invention is directed to the production of hexachlorophene by a two stage process in which one mol of 2,4,5-trichlorophenol and one mol of formaldehyde are reacted under the influence of an acid catalyst, after which the reaction product is condensed with one mol of 2,4,5-trichlorophenol through the agency of chlorosulfonic acid or fluorosulfonic acid.

RELATED APPLICATION

This application is a continuation-in-part of my co-pending application Ser. No. 489,036, now abandoned, filed Sept. 21, 1965, and having the same title as this application.

THE INVENTION

This invention relates generally to new and useful improvements for the production of 2,2'-methylene bis-(3,4,6-trichlorophenol), commonly called hexachlorophene, and particularly seeks to provide a novel two stage process for producing same.

The known processes for the preparation of hexachlorophene (2,2'-methylene bis(3,4,6-trichlorophenol)) involve the condensation of two mols of 2,4,5-trichlorophenol with one mol of formaldehyde (as Formalin or paraformaldehyde). The usual condensing agent is concentrated sulfuric acid or weak oleum, and the reaction may be carried out in the presence or absence of a solvent which is inert to the reactants and to the condensing agent.

In these processes it is customary to mix all of the reactants (and the solvent, if any) at once and to heat the mixture, with agitation, for a certain time. Conditions such as these are disadvantageous in the production of hexachlorophene in that:

(1) They tend to promote the formation of color bodies which make difficult the purification of the product;

(2) They tend to promote the formation of the by-product 2,4,5-trichlorobenzodioxolane with an attendant loss of yield;

(3) They require, if acceptable yields are to be obtained, extreme care that the 2,4,5-trichlorophenol and formaldehyde be present in exactly the molar ratio 2.00:1.00. Since the composition of Formalin or of formaldehyde is usually imprecise, and since a certain amount of formaldehyde is lost from the reaction mixture by volatilization, this is a difficult requirement to realize in practice.

However, through the use of this invention the above mentioned disadvantages in prior processes have been overcome.

Therefore, an object of this invention is to provide a new method of producing hexachlorophene from previously known source materials which is simpler, more effective and results in higher yields by comparison with prior processes.

Another object of this invention is to provide a process of the character stated in which one mol of 2,4,5-trichlorophenol and one mol of formaldehyde are reacted under the influence of an acidic catalyst to form a novel intermediate product, which in turn is condensed with one mol of 2,4,5-trichlorophenol through the agency of chlorosulfonic acid or fluorosulfonic acid to produce high yields of pure hexachlorophene.

With these and other objects, the nature of which will be apparent, the invention will be more fully understood by reference to the accompanying detailed description and the appended claims.

In accordance with this invention it has been discovered that:

(1) One mol of 2,4,5-trichlorophenol and one mol of formaldehyde will react, under the influence of acidic catalysts such as benzenesulfonic acid, anhydrous hydrogen, and diluted sulfuric acid, to form quantitatively and exclusively, a compound which has a melting point of 78° C. The compound has a chlorine content 46.5%, occurs in long colorless prisms, and definitely is not 2,4,5-trichlorosaligenin.

(2) The compound formed as in (1) can be condensed with 2,4,5-trichlorophenol, through the agency of chlorosulfonic acid or fluorosulfonic acid, to produce high yields of pure hexachlorophene.

Both of these reactions are surprising. The only hitherto known reaction product of equimolar amounts of 2,4,5-trichlorophenol and formaldehyde is 2,4,5-trichlorosaligenin, which is formed under alkaline conditions and has a melting point of 128° C. 2,4,5-trichlorophenol, which is relatively inert to concentrated sulfuric acid and to oleum, will react readily with chlorosulfonic acid and fluorosulfonic acid to form 2,4,5-trichlorophenol-6-sulfonic acid.

The following examples will illustrate this invention.

Example 1

197.5 grams of 2,4,5-trichlorophenol having a melting point of 66° C. is dissolved in 1000 grams of perchloroethylene and the solution is warmed to 50° C. with agitation. To this solution is added 50 grams of 90° sulfuric acid. 30 grams of paraformaldehyde is added slowly over a period of one hour with sufficient cooling to maintain the temperature between 60° C. and 70° C. The reaction is exothermic. The mixture is stirred for an additional two hours at 70° C. The perchloroethylene solution is then separated from the dilute acid layer. Upon evaporating a small sample to dryness a crystalline product is obtained which has a melting point of 78° C. There is no free formaldehyde remaining either in the dilute acid layer or in the perchloroethylene solution. There is no hexachlorophene present at this point in the reaction mixture, nor any unreacted 2,4,5-trichlorophenol.

The perchloroethylene solution of the product of the reaction between 2,4,5-trichlorophenol and paraformaldehyde is mixed with a solution of 197.5 grams of 2,4,5-trichlorophenol in 1000 grams of perchloroethylene and the mixture is heated with agitation to 75° C. There is then introduced dropwise over a period of three hours 116 grams of chlorosulfonic acid. The addition of chlorosulfonic acid is accompanied by a mild exothermic reaction and by the evolution of HCl. The temperature is maintained at 75° C. throughout the chlorosulfonic acid addition and is then held at 75° C. to 80° C. for an additional two hours. Agitation is stopped, the remaining sulfuric acid layer is allowed to settle and is separated. The hot perchloroethylene solution is stirred with 10 grams of activated charcoal and is filtered. The reaction product, 2,2'-methylene bis(3,4,6-trichlorophenol), crystallizes upon cooling and is separated by filtration. The yield is 310 grams having a melting point of 162° C. Upon concentration of the mother liquors there is obtained an additional 65 grams of product having the same melting point.

Example 2

197.5 grams of 2,4,5-trichlorophenol having a melting point of 62° C. is dissolved in 2000 ml. of chloroform, and the solution is warmed to 50° C. with agitation. Dry hydrogen chloride is bubbled through the solution at a rate of 5 grams per minute, and over a period of one hour, 31.6 grams of 95% paraformaldehyde is added. Hydrogen chloride addition is continued for 30 minutes, and the mixture is then heated to reflux for one hour.

A small sample of the reaction mixture, evaporated to dryness, yields a white crystalline compound, having a melting point of 78° C. It contains no 2,4,5-trichlorophenol or formaldehyde.

To the reaction mixture is then added a solution of 197.5 grams of 2,4,5-trichlorophenol, having a melting point of 62° C., in 2000 ml. of chloroform. The mixture is heated to 65° C., under a reflux condenser and with good agitation, 100 grams of fluorosulfonic acid is added dropwise, over a period of three hours. Agitation and heating at 65° C. are continued for three hours more, then agitation is stopped, the acid layer is settled and separated. The hot chloroform solution is stirred with 10 grams activated charcoal, filtered and cooled to 10° C. The crystallized 2,2'-methylene bis(3,4,6-trichlorophenol) is filtered off, washed with cold chloroform and dried. The yield is 310 grams having a melting point of 164° C. Evaporation of the mother liquor yields an additional 70 grams of product.

Example 3

To 1000 ml. of benzene is added, slowly, 58 grams of chlorosulfonic acid, and the solution is then heated to reflux until all HCl is driven off. There is thus produced a benzene solution containing 79 grams benzenesulfonic acid. To this solution is added 197.5 grams 2,4,5-trichlorophenol having a melting point of 62° C. The solution is then heated just to the point of reflux, and with good agitation, 85 grams of 37% Formalin is added over two hours, while the water introduced with the Formalin is taken off as an azeotrope with benzene. The condensed benzene is returned to the reaction mixture. Reflux is then continued for one hour, after which 500 ml. of water is added. The mixture stirred 15 minutes at 60° C., and settled. The water layer which contains the benzenesulfonic acid, is separated and discarded.

A small sample of the benzene solution evaporated to dryness, yields a white crystalline product having a melting point of 78° C. It contains no 2,4,5-trichlorophenol or formaldehyde.

The benzene solution is added to 2000 ml. of perchloroethylene, and the benzene is removed from the mixture by fractional distillation.

To the remaining perchloroethylene solution of the reaction product of 2,4,5-trichlorophenol with Formalin is added 197.5 grams 2,4,5-trichlorophenol having a melting point of 62° C. The solution is heated to 75° C., and with vigorous agitation is added, over five hours, 116 grams chlorosulfonic acid. Stirring is continued at 75° C. for two hours and the acid layer is then settled and separated. The hot perchloroethylene solution is stirred with ten grams activated charcoal, filtered and cooled to 10° C. The crystallized 2,2'-methylene bis(3,4,6-trichlorophenol) is filtered off, washed with cold perchloroethylene and dried. The yield is 280 grams having a melting point of 163° C. Evaporation of the mother liquor yields an additional 85 grams of product.

I claim:

1. In a method for producing hexachlorophene the steps of, supplying a solution of 2,4,5-trichlorophenol and formaldehyde at a 1 to 1 molar ratio in a solvent selected from the group consisting of perchloroethylene, chloroform and benzene, reacting said 2,4,5-trichlorophenol and formaldehyde in the pressure of an acid catalyst selected from the group consisting of benzene-sulfonic acid, anhydrous hydrogen chloride and diluted sulfuric acid to form a solution of a compound which, when dry, has a melting point of 78° C. and a chlorine content of 46.5%, then adding a solution of 1 mol of 2,4,5-trichlorophenol to the solution containing the reaction product of the preceding step, and effecting condensation therebetween by the addition of a sulfonic acid selected from the group consisting of chlorosulfonic acid and fluorosulfonic acid to produce pure hexachlorophene.

2. A reatcion product between 2,4,5-trichlorophenol and formaldehyde, having a melting point of 78° C. and a chlorine content of 46.5%, produced by supplying a solution of 2,4,5-trichlorophenol and formaldehyde at a 1 to 1 molar ratio in a solvent selected from the group consisting of perchloroethylene, chloroform and benzene, reacting said 2,4,5-trichlorophenol and formaldehyde in the presence of an acid catalyst selected from the group consisting of benzenesulfonic acid, anhydrous hydrogen chloride and diluted sulfuric acid, and separating the solvent solution containing the reaction product from the acid.

3. In a method for producing hexachlorophene the steps of; dissolving a molar equivalent of 2,4,5-trichlorophenol in a solvent selected from the group consisting of perchlorethylene, chloroform and benzene; adding to said solution an acid catalyst selected from the group consisting of benzenesulfonic acid, anhydrous hydrogen chloride and diluted sulfuric acid; then adding a molar equivalent of formaldehyde and maintaining the temperature between about 60° C. and about 70° C. during the exothermic reaction produced as the result of such addition to produce a reaction product which, when dry, has a melting point of 78° C. and a chlorine content of 46.5%; separating the solvent solution from the acid; adding a molar equivalent of 2,4,5-trichlorophenol dissolved in said solvent to said separated solvent solution; effecting condensation between said added molar equivalent of said 2,4,5-trichlorophenol and the reaction product in said separated solvent solution by the addition of an acid selected from the group consisting of chlorosulfonic acid and fluorosulfonic acid; then removing the solvent solution containing the condensed product and recovering pure hexachlorophene therefrom by cooling and filtering same.

References Cited

UNITED STATES PATENTS

| | | |
|---|---|---|
| 2,745,881 | 5/1956 | Rigterink _____ 260—623 X |
| 2,812,365 | 11/1957 | Gump et al. |
| 3,196,185 | 7/1965 | Ranson. |

FOREIGN PATENTS

| | | |
|---|---|---|
| 760,341 | 10/1956 | Great Britain. |
| 760,342 | 10/1956 | Great Britain. |

OTHER REFERENCES

Groggins, P.H.: Unit Processes in Organic Synthesis, New York, McGraw-Hill, 1958, pp. 323–4.

Wegler et al.: MaKromol. Chem. 9, pp. 1–9, 16–21 (1952).

LEON ZITVER, Primary Examiner

N. MORGENSTERN, Assistant Examiner